US012752941B2

(12) United States Patent
Zhang et al.

(10) Patent No.: US 12,752,941 B2
(45) Date of Patent: Oct. 6, 2026

(54) PANORAMIC UNMANNED AERIAL VEHICLE

(71) Applicant: ARASHI VISION INC., Shenzhen (CN)

(72) Inventors: Guilin Zhang, Shenzhen (CN); Fei Gao, Shenzhen (CN)

(73) Assignees: ARASHI VISION INC., Shenzhen (CN); ANTIGRAVITY (SZ) TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/181,350

(22) Filed: Apr. 17, 2025

(65) Prior Publication Data

US 2026/0145825 A1 May 28, 2026

Related U.S. Application Data

(63) Continuation of application No. PCT/CN2022/132743, filed on Nov. 18, 2022.

(51) Int. Cl.
*B64U 20/87* (2023.01)
*B64U 10/14* (2023.01)
(Continued)

(52) U.S. Cl.
CPC ............. *B64U 20/87* (2023.01); *B64U 10/14* (2023.01); *B64U 20/50* (2023.01); *B64U 30/293* (2023.01);
(Continued)

(58) Field of Classification Search
CPC ........ B64U 20/87; B64U 10/14; B64U 20/50; B64U 30/293; B64U 2101/30; G02B 13/06; G03B 15/006; G03B 37/00
See application file for complete search history.

(56) References Cited

U.S. PATENT DOCUMENTS 8,695,919 B2 * 4/2014 Shachor ................. B64U 10/60
244/17.11
9,527,588 B1 * 12/2016 Rollefstad .............. B64U 10/13
(Continued)

FOREIGN PATENT DOCUMENTS

CN 103387051 A 11/2013
CN 104890875 A 9/2015
(Continued)

OTHER PUBLICATIONS

Supplementary European Search Report issued in corresponding European Application No. EP 22965548, mailed on Aug. 27, 2025, 11 pages.
(Continued)

*Primary Examiner* — Medhat Badawi
(74) *Attorney, Agent, or Firm* — BAYES PLLC

(57) ABSTRACT

In some aspects of the present disclosure, a panoramic unmanned aerial vehicle (UAV) is provided. The panoramic UAV may include a body, a first fisheye lens protruding from one side of the body, a second fisheye lens protruding from an opposing side of the body, and a rear arm arranged on the body. The rear arm may include a first propeller and a first driving component that is configured to drive the first propeller to rotate. An axis of the first driving component intersects with a vertical direction.

30 Claims, 7 Drawing Sheets

(51) Int. Cl.

| | |
|---|---|
| ***B64U 20/50*** | (2023.01) |
| ***B64U 30/293*** | (2023.01) |
| ***G02B 13/06*** | (2006.01) |
| ***G03B 15/00*** | (2021.01) |
| ***G03B 37/00*** | (2021.01) |
| *B64U 101/30* | (2023.01) |

(52) U.S. Cl.

CPC ........... *G02B 13/06* (2013.01); *G03B 15/006* (2013.01); *G03B 37/00* (2013.01); *B64U 2101/30* (2023.01)

(56) References Cited

U.S. PATENT DOCUMENTS

| | | | | |
|---|---|---|---|---|
| 9,635,225 | B2 * | 4/2017 | Okamura | H04N 23/51 |
| 9,676,477 | B1 * | 6/2017 | Kimchi | B64U 30/20 |
| 10,118,697 | B2 * | 11/2018 | Weissenberg | B64U 30/293 |
| 10,165,256 | B2 * | 12/2018 | Grenier | B64C 29/0025 |
| 10,315,761 | B2 * | 6/2019 | Mccullough | B64C 39/02 |
| 10,513,329 | B2 * | 12/2019 | Ou | B64U 30/20 |
| 11,254,427 | B2 * | 2/2022 | Lee | B64U 20/87 |
| 11,541,999 | B2 * | 1/2023 | Atamanov | B64C 11/46 |
| 11,905,005 | B2 * | 2/2024 | Cappelleri | G05D 1/654 |
| 12,145,753 | B2 * | 11/2024 | Bitar | B64U 50/14 |
| 2003/0010864 | A1 * | 1/2003 | Aumont | F41G 3/22 244/1 R |
| 2011/0226892 | A1 * | 9/2011 | Crowther | B64C 15/02 244/17.23 |
| 2017/0057630 | A1 * | 3/2017 | Schwaiger | B64C 3/385 |
| 2017/0297738 | A1 * | 10/2017 | von Flotow | B64D 1/02 |
| 2017/0309088 | A1 * | 10/2017 | Arya | H04L 67/568 |
| 2018/0181119 | A1 * | 6/2018 | Lee | G05D 1/0202 |
| 2018/0186472 | A1 * | 7/2018 | Wan | H04N 23/698 |
| 2018/0208301 | A1 * | 7/2018 | Ye | B64U 30/29 |
| 2018/0231972 | A1 * | 8/2018 | Woon | G08G 5/55 |
| 2019/0002124 | A1 * | 1/2019 | Garvin | B64D 47/08 |
| 2019/0127063 | A1 * | 5/2019 | Gozluklu | B64C 37/02 |
| 2019/0329903 | A1 * | 10/2019 | Thompson | B64C 27/32 |
| 2020/0001990 | A1 * | 1/2020 | Jiang | B64C 11/02 |
| 2020/0023995 | A1 * | 1/2020 | Song | B64D 45/00 |
| 2020/0391864 | A1 * | 12/2020 | Lee | B64U 20/87 |
| 2021/0129984 | A1 * | 5/2021 | Takao | B60L 3/0092 |
| 2021/0214067 | A1 * | 7/2021 | West | B64U 20/83 |
| 2021/0214068 | A1 * | 7/2021 | Bry | B64U 20/83 |
| 2021/0273422 | A1 * | 9/2021 | Lavoie | H02G 1/02 |
| 2022/0194578 | A1 * | 6/2022 | Litton | G01N 21/954 |
| 2022/0380044 | A1 * | 12/2022 | Arnold | B64U 20/30 |
| 2022/0411052 | A1 * | 12/2022 | Angelucci | B64U 20/87 |
| 2023/0280742 | A1 * | 9/2023 | Bachrach | G05D 1/0094 701/2 |
| 2023/0337232 | A1 * | 10/2023 | Qian | B64U 30/20 |
| 2024/0083603 | A1 * | 3/2024 | Schlak | B64C 29/0025 |
| 2024/0111134 | A1 * | 4/2024 | Takahashi | G03B 17/02 |
| 2024/0132237 | A1 * | 4/2024 | Xiao | B64U 10/25 |
| 2025/0011017 | A1 * | 1/2025 | Kim | B64U 70/90 |
| 2025/0390097 | A1 * | 12/2025 | Kawakami | B64C 39/02 |

FOREIGN PATENT DOCUMENTS

| | | | |
|---|---|---|---|
| CN | 205121152 | U | 3/2016 |
| CN | 107640327 | A | 1/2018 |
| CN | 112429212 | A | 3/2021 |
| CN | 217706281 | U | 11/2022 |
| EP | 408997 | A1 | 11/2022 |
| JP | 5812849 | B2 | 11/2015 |
| WO | 2017118668 | A1 | 7/2017 |
| WO | 2021/146295 | A1 | 7/2021 |

OTHER PUBLICATIONS

First Office Opinion Notice issued in corresponding Chinese Application No. 202280101147.2, mailed Oct. 29, 2025, 22 pages.

International Search Report in the international application No. PCT/CN2022/132743, mailed on Jul. 30, 2023. 7 pages with English translation.

Written Opinion of the International Search Authority in the international application No. PCT/CN2022/132743, mailed on Jul. 30, 2023. 7 pages with English translation.

International Preliminary Report on Patentability (Chapter I of the Patent Cooperation Treaty) in the international application No. PCT/CN2022/132743, mailed on Jul. 30, 2023. 9 pages with English translation.

* cited by examiner

PANORAMIC UNMANNED AERIAL VEHICLE

CROSS-REFERENCE TO RELATED APPLICATION

This application is a continuation of International Application No. PCT/CN 2022/132743, filed on Nov. 18, 2022, the entire content of which is hereby incorporated by reference in its entirety.

BACKGROUND

The present disclosure relates to unmanned aerial vehicles (UAVs), and more particularly, to a panoramic UAV.

UAVs are typically equipped with one or more cameras mounted on its body to capture video. In order to obtain panoramic images or videos, the arrangement of the camera may need to be carefully considered.

SUMMARY

According to some implementations, a panoramic UAV is provided in which the propellers do not obstruct the field of view range.

A panoramic UAV includes:

- a body, including a top shell, a bottom shell, and a side shell connected between the top shell and the bottom shell;
- a first fisheye lens, provided on the top shell, the first fisheye lens having a first field of view region and a first stitching region not exceeding the range of the first field of view region;
- a second fisheye lens, provided on the bottom shell, the second fisheye lens having a second field of view region and a second stitching region not exceeding the range of the second field of view region, the second field of view region intersecting with the first field of view region to form an overlapping area and a field of view blind area, and a region not covered by either the first stitching region or the second stitching region forming a stitching blind area;
- a rear arm, provided on the side shell, the rear arm including a first propeller and a first driving component configured to drive the first propeller to rotate; and
- a front arm, provided on the side shell, the front arm including a second propeller and a second driving component configured to drive the second propeller to rotate,
- where both the rear arm and the front arm are located in the stitching blind area, and a plane passing through the central line of the first fisheye lens and perpendicular to a horizontal plane is defined as a reference plane, and a projection of an axis of the first driving component on the reference plane intersects with a projection of an axis of the second driving component on the reference plane below the bottom shell and between the first driving component and the second driving component.

The first field of view region of the first fisheye lens and the second field of view region of the second fisheye lens intersect, enabling panoramic shooting. Additionally, since the rear arm and the front arm are both located in the stitching blind area, and the projection of the axis of the first driving component on the reference plane intersects with the projection of the axis of the second driving component on the reference plane below the bottom shell and between the first driving component and the second driving component, this means that the axes of the first and second driving components extend outwardly inclined toward the bottom shell. As a result, since the first propeller and the second propeller are driven by the first and second driving components, respectively, the first propeller and the second propeller are arranged outwardly inclined relative to the bottom shell, effectively preventing the field of view range from being obstructed by the propellers.

In some implementations, an angle formed between the axis of the first driving component and the vertical direction is 0° to 20°, and an angle formed between the axis of the second driving component and the vertical direction is 0° to 20°.

In some implementations, the side shell includes opposite first and second side shells, the rear arm includes a left rear arm and a right rear arm respectively connected to the first side shell and the second side shell, and the front arm includes a left front arm and a right front arm respectively connected to the first side shell and the second side shell.

In some implementations, the second driving component of the left front arm drives the second propeller to rotate counterclockwise, the second driving component of the right front arm drives the second propeller to rotate clockwise, the first driving component of the left rear arm drives the first propeller to rotate clockwise, and the first driving component of the right rear arm drives the first propeller to rotate counterclockwise.

In some implementations, the side shell further includes a first connecting shell and a second connecting shell, the first connecting shell and the second connecting shell connecting two ends of the first side shell and the second side shell, and the first fisheye lens is positioned close to the first connecting shell.

In some implementations, the top shell includes a first top shell part and a second top shell part connected to the first top shell part, the first fisheye lens protrudes from the first top shell part, and the second top shell part extends obliquely from one end of the first top shell part toward the bottom shell.

In some implementations, in a vertical direction, the left front arm and the right front arm are closer to the first fisheye lens than the left rear arm and the right rear arm.

In some implementations, the rear arm includes a first rotating arm rotatably connected to the side shell, the first driving component is provided at an end of the first rotating arm, the front arm includes a second rotating arm rotatably connected to the side shell, the second driving component is provided at an end of the second rotating arm, and the first rotating arm and the second rotating arm rotate toward each other and toward their respective side shells.

In some implementations, the rear arm includes a first rotating arm rotatably connected to the side shell, the first rotating arm includes an inclined surface facing the first driving component, the first driving component can be securely arranged on the inclined surface, a plane where the first propeller is located is parallel to the inclined surface and perpendicular to the axis of the first driving component, and a side of the first driving component closer to the first fisheye lens is higher than a side of the first driving component further from the first fisheye lens.

In some implementations, the bottom shell includes a first bottom shell part and a second bottom shell part, the second bottom shell part extends obliquely from one end of the first bottom shell part toward the top shell, and the second fisheye lens protrudes from the second bottom shell part.

In some implementations, the bottom shell is provided with a supporting part, a surface of the supporting part away from the top shell is a supporting surface, and the second fisheye lens is located completely between the top shell and a plane where the supporting surface is located.

In some implementations, the front arm and the rear arm have an unfolded mode, a surface of the rear arm at an end away from the top shell is a grounding surface, and in the unfolded mode, the grounding surface is coplanar with the supporting surface of the supporting part.

In some implementations, upper ends of the central line of the first fisheye lens and the central line of the second fisheye lens are inclined toward the rear arm.

In some implementations, the central line of the first fisheye lens coincides with the central line of the second fisheye lens.

In some implementations, angles formed between the central line of the first fisheye lens and the vertical direction and between the central line of the second fisheye lens and the vertical direction are both less than 20°.

In some aspects, a panoramic UAV is provided. The panoramic UAV includes: a body including a side shell, the side shell including opposite first and second side shells; a rear arm including a left rear arm and a right rear arm respectively connected to the first side shell and the second side shell, each rear arm including a first propeller and a first driving component configured to drive the first propeller to rotate, the first driving component of the left rear arm driving the first propeller to rotate clockwise, and the first driving component of the right rear arm driving the first propeller to rotate counterclockwise; and a front arm including a left front arm and a right front arm respectively connected to the first side shell and the second side shell, each front arm including a second propeller and a second driving component configured to drive the second propeller to rotate, the second driving component of the left front arm driving the second propeller to rotate counterclockwise, and the second driving component of the right front arm driving the second propeller to rotate clockwise.

During flight of the panoramic UAV, lift is generated by the counterclockwise rotation of the left front second propeller, the clockwise rotation of the right front second propeller, the clockwise rotation of the left rear first propeller, and the counterclockwise rotation of the right rear first propeller, enabling the panoramic UAV to take off and fly.

In some implementations, the body further includes a top shell and a bottom shell, the side shell connects the top shell and the bottom shell, and the left front arm and the right front arm are closer to the top shell than the left rear arm and the right rear arm.

In some implementations, the body further includes a top shell and a bottom shell, the side shell is connected between the top shell and the bottom shell, and the panoramic UAV further includes a first fisheye lens provided on the top shell and a second fisheye lens provided on the bottom shell. The first fisheye lens includes a first field of view region, and the second fisheye lens includes a second field of view region. The second field of view region intersects with the first field of view region to form an overlapping area and a field of view blind area, and both the rear arm and the front arm are located in the field of view blind area. A plane passing through the central line of the first fisheye lens and perpendicular to a horizontal plane is defined as a reference plane, and a projection of an axis of the first driving component on the reference plane intersects with a projection of an axis of the second driving component on the reference plane below the bottom shell and between the first driving component and the second driving component.

In some implementations, an angle formed between the axis of the first driving component and the vertical direction is 0° to 20°, and an angle formed between the axis of the second driving component and the vertical direction is 0° to 20°.

In some implementations, the rear arm includes a first rotating arm rotatably connected to the side shell, the first rotating arm includes an inclined surface facing the first driving component, the first driving component can be securely arranged on the inclined surface, a plane where the first propeller is located is parallel to the inclined surface and perpendicular to the axis of the first driving component, and a side of the first driving component closer to the second driving component is higher than a side of the first driving component further from the second driving component.

In some aspects, a panoramic UAV is provided. The UAV may include a body; a first fisheye lens protruding from one side of the body; a second fisheye lens protruding from an opposing side of the body; and a rear arm arranged on the body and having a first propeller and a first driving component configured to drive the first propeller to rotate. An axis of the first driving component may intersect with a vertical direction.

In some implementations, an angle formed between the axis of the first driving component and the vertical direction may be greater than 0° and less than 20°.

In some implementations, a side of the first driving component that is closer to the first fisheye lens may be higher than another side that is further from the first fisheye lens.

In some implementations, the rear arm may further include a first rotating arm rotatably connected with the body, the first driving component being arranged at an end of the first rotating arm. The first rotating arm may include an inclined surface facing the first driving component, and the first driving component may be arranged on the inclined surface, a plane in which the first propeller is located may be parallel to the inclined surface and perpendicular to the axis of the first driving component.

In some implementations, the UAV may further include a front arm arranged on the body and having a second propeller and a second driving component configured to drive the second propeller to rotate, where an axis of the second driving component may intersect the vertical direction.

In some implementations, an angle formed between the axis of the second driving component and the vertical direction may be greater than 0° and less than 20°.

In some implementations, in the vertical direction, the front arm may be closer to the first fisheye lens than a rear arm.

In some implementations, the rear arm may further include a first rotating arm rotatably connected with the body, the first driving component being arranged at an end of the first rotating arm. The front arm may further include a second rotating arm rotatably connected with the body, the second driving component being arranged at an end of the second rotating arm. The first rotating arm and the second rotating arm may be configured to rotate toward each other and toward the body.

In some implementations, a supporting part may be provided on the bottom of the body. The supporting part may include a supporting surface at a side of the supporting part that faces away from the body, and the second fisheye lens may be located above a plane where the supporting surface lies.

In some implementations, a side of an end of the rear arm opposite to the body may include a ground surface. In an unfolded mode, the ground surface may be coplanar with the supporting surface of the supporting part.

In some implementations, at least one of an upper end of a central line of the first fisheye lens or an upper end of a center line of the second fisheye lens may be inclined toward the rear arm.

In some implementations, a central line of the first fisheye lens and a central line of the second fisheye lens may coincide to form a coincided central line.

In some implementations, an angle formed between the coincided central line and the vertical direction may be less than 20°.

In some aspects, a panoramic UAV is provided. The panoramic UAV may include a body; a first fisheye lens protruding from one side of the body; a second fisheye lens protruding from an opposing side of the body; and a front arm arranged on the body and having a second propeller and a second driving component configured to drive rotation of the second propeller. An axis of the second driving component may intersect a vertical direction.

In some implementations, an angle formed between the axis of the second driving component and the vertical direction may be greater than 0° and less than 20°.

In some implementations, the panoramic UAV may further include a rear arm arranged on the body and having a first propeller and a first driving component configured to drive rotation of the first propeller. An angle formed between the axis of the first driving component and the vertical direction may be greater than 0° and less than 20°.

In some aspects, a panoramic UAV is provided. The panoramic UAV may include a body; a first fisheye lens protruding from one side of the body; and a second fisheye lens protruding from an opposing side of the body. A central line of the first fisheye lens and a central line of the second fisheye lens may coincide to form a coincided central line. The coincided central line may intersect with a vertical direction.

In some implementations, the one side of the body may include a top of the body, and the opposing side of the body may include a bottom of the body.

In some implementations, an upper end of the coincided central line may be inclined toward a rear arm of the panoramic UAV.

In some implementations, the panoramic UAV may further include the rear arm arranged on the body and having a first propeller and a first driving component configured to drive the first propeller to rotate; and a front arm arranged on the body and having a second propeller and a second driving component configured to drive the second propeller to rotate. In the vertical direction, the front arm may be closer to the first fisheye lens than the rear arm.

In some implementations, the rear arm may further include a first rotating arm rotatably connected with the body, the first driving component being arranged at an end of the first rotating arm. The front arm may further include a second rotating arm rotatably connected with the body, the second driving component being arranged at an end of the second rotating arm. The first rotating arm and the second rotating arm may be configured to rotate toward each other and toward the body.

In some aspects, a panoramic UAV is provided. The panoramic UAV may include a body; a first fisheye lens protruding from one side of the body; a second fisheye lens protruding from an opposing side of the body; and two front arms arranged on the body. A central line of the first fisheye lens and a central line of the second fisheye lens may coincide. At least one of the first fisheye lens and the second fisheye lens may be located between the two front arms.

In some implementations, the central line of the first fisheye lens and the central line of the second fisheye lens may intersect with a vertical direction.

In some implementations, at least one of an upper end of a central line of the first fisheye lens or an upper end of a center line of the second fisheye lens may be inclined toward a rear arm.

In some implementations, the central line of the first fisheye lens and the central line of the second fisheye lens may be located between the two front arms.

In some implementations, the panoramic UAV may further include a rear arm arranged on the body and including a first propeller and a first driving component configured to drive rotation of the first propeller. An axis of the first driving component may intersect with a vertical direction.

In some implementations, the first fisheye lens may include a first stitching region; the second fisheye lens may include a second stitching region; a stitching blind area may be formed by a region that is not covered by the first stitching region and is not covered by the second stitching region; and remaining components of the panoramic UAV, other than the first fisheye lens and the second fisheye lens, may be located within the stitching blind area.

In some implementations, an angle formed between the axis of the first driving component and the vertical direction may be greater than 0° and less than 20°.

In some implementations, at least one of the two front arms may include a second propeller and a second driving component configured to drive rotation of the second propeller; and an axis of the second driving component may intersect a vertical direction.

In some implementations, an angle formed between the axis of the second driving component and the vertical direction may be greater than 0° and less than 20°.

Details of one or more implementations of the present disclosure are set forth in the accompanying drawings and description below. Other features, objectives, and advantages of the present disclosure will become apparent from the description, drawings, and claims.

BRIEF DESCRIPTION OF DRAWINGS

To more clearly illustrate the technical solutions in the implementations of the present disclosure or the related art, the drawings required for the description of the implementations, or the related art will be briefly introduced below. It is evident that the drawings described below are merely examples of the present disclosure. For those skilled in the art, other drawings can be obtained based on the disclosed drawings without creative efforts.

Figure 1:
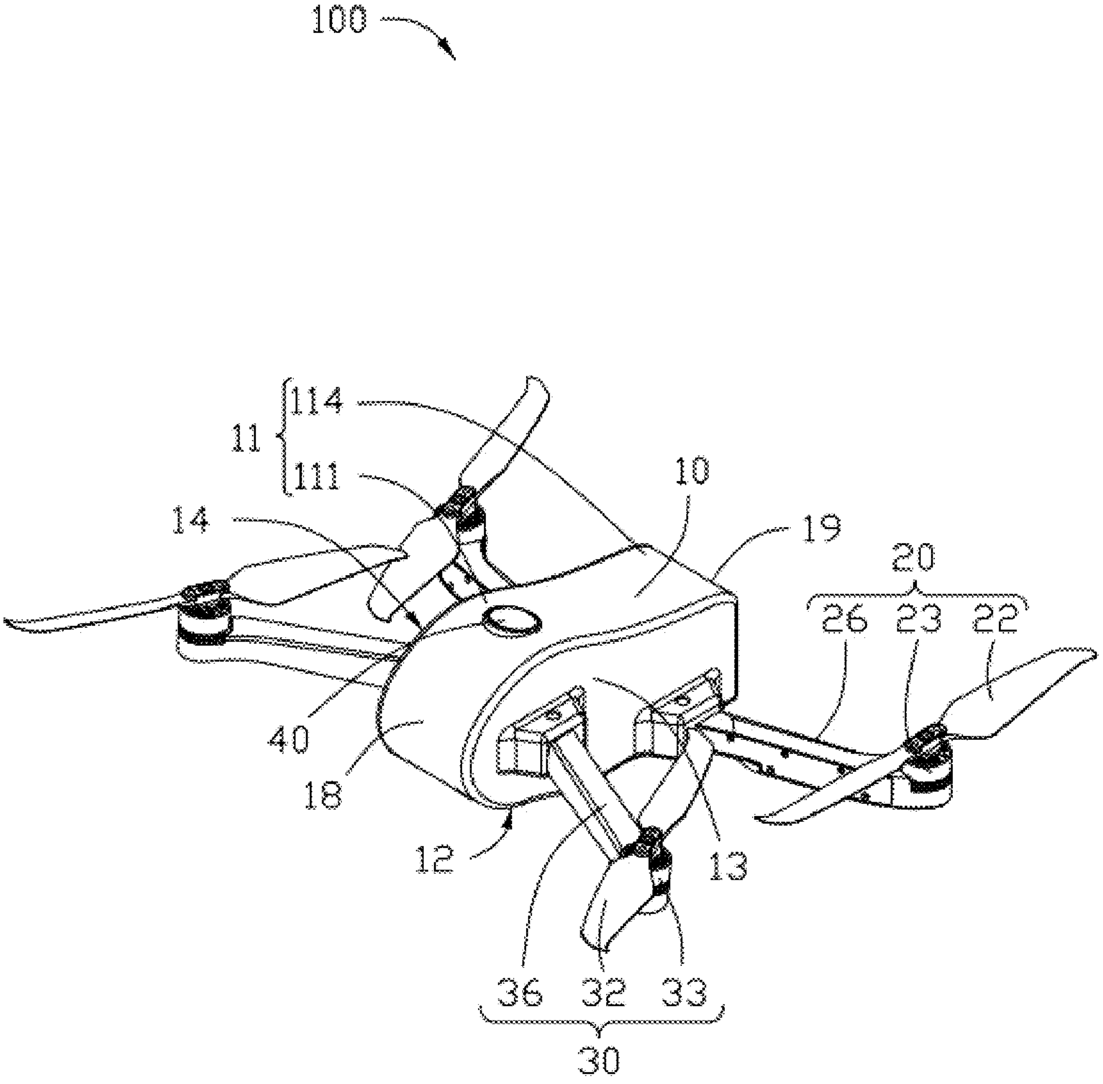
FIG. 1 is a perspective view of a panoramic UAV, according to some implementations of the present disclosure.

The present disclosure will be described with reference to the accompanying drawings.

DETAILED DESCRIPTION

The following provides a clear and complete description of the technical solutions in the implementations of the present disclosure in conjunction with the accompanying drawings. It is evident that the implementations described are merely part of the implementations of the present disclosure and not all of them. Based on the implementations of the present disclosure, all other implementations obtained by those skilled in the art without creative efforts fall within the scope of protection of the present disclosure.

In the description of the present disclosure, it should be understood that terms such as “center,” “longitudinal,” “transverse,” “length,” “width,” “thickness,” “upper,” “lower,” “front,” “rear,” “left,” “right,” “vertical,” “horizontal,” “top,” “bottom,” “inner,” “outer,” “clockwise,” “counterclockwise,” “axial,” “radial,” “circumferential,” and the like may indicate orientations or positional relationships based on the orientations or positional relationships shown in the drawings. These terms are merely for the convenience of describing the present disclosure and simplifying the description, rather than indicating or implying that the referenced devices or components must have specific orientations, be constructed in specific orientations, or operate in specific orientations. In some implementations, the top side and the bottom side may be opposite to each other, and thus one of them is referred to one side while the other is referred to as an opposing side. Therefore, they should not be construed as limitations to the present disclosure.

Furthermore, the terms “first” and “second” are used for descriptive purposes only and should not be understood as indicating or implying relative importance or implicitly specifying the number of technical features indicated. Thus, features defined as the terms “first” and “second” may explicitly or implicitly include at least one of the features. In the description of the present disclosure, the terms “a plurality of” and “multiple” can be at least two, such as two or three, unless explicitly and specifically defined otherwise.

In the present disclosure, unless explicitly specified and defined otherwise, terms such as “mounted,” “connected,” “fixed,” and the like should be interpreted broadly. For example, they may refer to fixed connections, detachable connections, or integral connections; they may refer to mechanical connections or electrical connections; they may refer to direct connections or indirect connections through intermediate media; or they may refer to internal communication between two components or an interaction relationship between two components. For those skilled in the art, the specific meanings of the above terms in the present disclosure can be understood based on specific circumstances.

In the present disclosure, unless explicitly specified and defined otherwise, when a first feature is “on” or “under” a second feature, it may mean that the first and second features are in direct contact, or that the first and second features are indirectly in contact through an intermediate medium. Moreover, when the first feature is “above,” “over,” or “on top of” the second feature, it may mean that the first feature is directly above or obliquely above the second feature, or it may simply indicate that the first feature is at a higher horizontal level than the second feature. Similarly, when the first feature is “below,” “under,” or “beneath” the second feature, it may mean that the first feature is directly below or obliquely below the second feature, or it may simply indicate that the first feature is at a lower horizontal level than the second feature.

It should be noted that when an element is described as being “fixed to” or “disposed on” another element, it may be directly on the other element or there may be an intervening element. When an element is described as being “connected to” another element, it may be directly connected to the other element or there may be an intervening element. The terms “vertical,” “horizontal,” “upper,” “lower,” “left,” “right,” and similar expressions used herein are for illustrative purposes only and do not represent the only implementation.

Panoramic UAVs typically use multi-lens fisheye cameras or single-lens rotating fisheye cameras to capture images, and accordingly generate panoramic images, e.g., through image stitching algorithms. However, due to the fixed physical structure between moving components (such as UAV arms and propellers, and the UAV body), these moving components can easily enter the field of view of the fisheye lens during flight. This often results in interference in the images, such as blocked regions caused by the arms, propellers, or body of the UAV.

Please refer to FIGS. 1 to 5. According to some implementations of the present disclosure, a panoramic UAV 100 is provided, which may include a body 10, a rear arm 20, a front arm 30, a first fisheye lens 40, and a second fisheye lens 50. The body 10 may include a top shell 11, a bottom shell 12, and a side shell connected between the top shell 11 and the bottom shell 12. The first fisheye lens 40 can be provided on the top shell 11 and may include a first field of view region 60 and a first stitching region that does not exceed the range of the first field of view region 60 (shown in FIG. 3). In some examples, the first stitching region may be arranged within the range of the first field of view region 60. The second fisheye lens 50 can be provided on the bottom shell 12 and may include a second field of view region 70 and a second stitching region that does not exceed the range of the second field of view region 70. In some examples, the second stitching region may be arranged within the range of the second field of view region 70.

Figure 4:
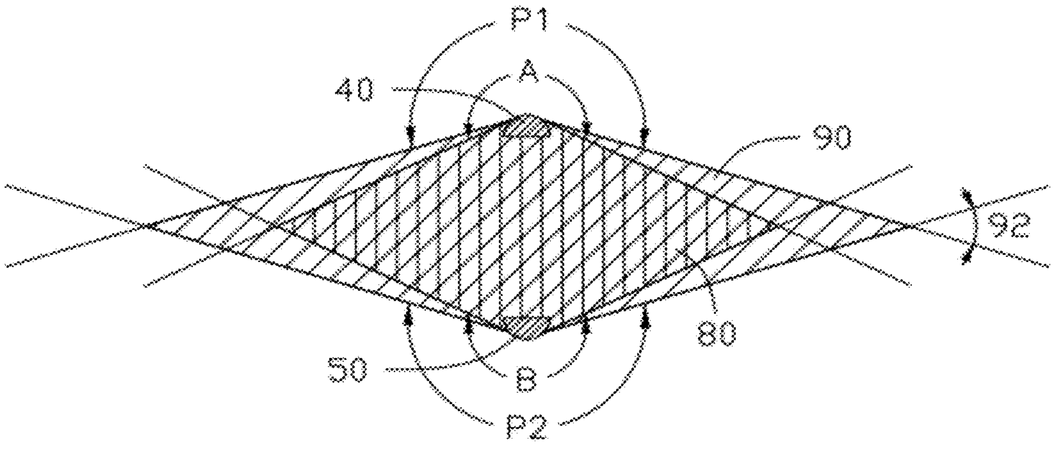
FIG. 4 is a schematic diagram of the field of view regions and stitching regions of the fisheye lenses of a panoramic UAV, according to some implementations of the present disclosure.

The second field of view region 70 intersects with the first field of view region 60 to form an overlapping area (shown in FIG. 4) and a field of view blind area 80. A region not covered by either the first stitching region or the second stitching region can form a stitching blind area 90, as shown in FIG. 4. The overlapping area may refer to the area covered by both the second field of view region 70 and the first field of view region 60. The field of view blind area 80 may refer to the area not covered by either the second field of view region 70 or the first field of view region 60.

Figure 2:
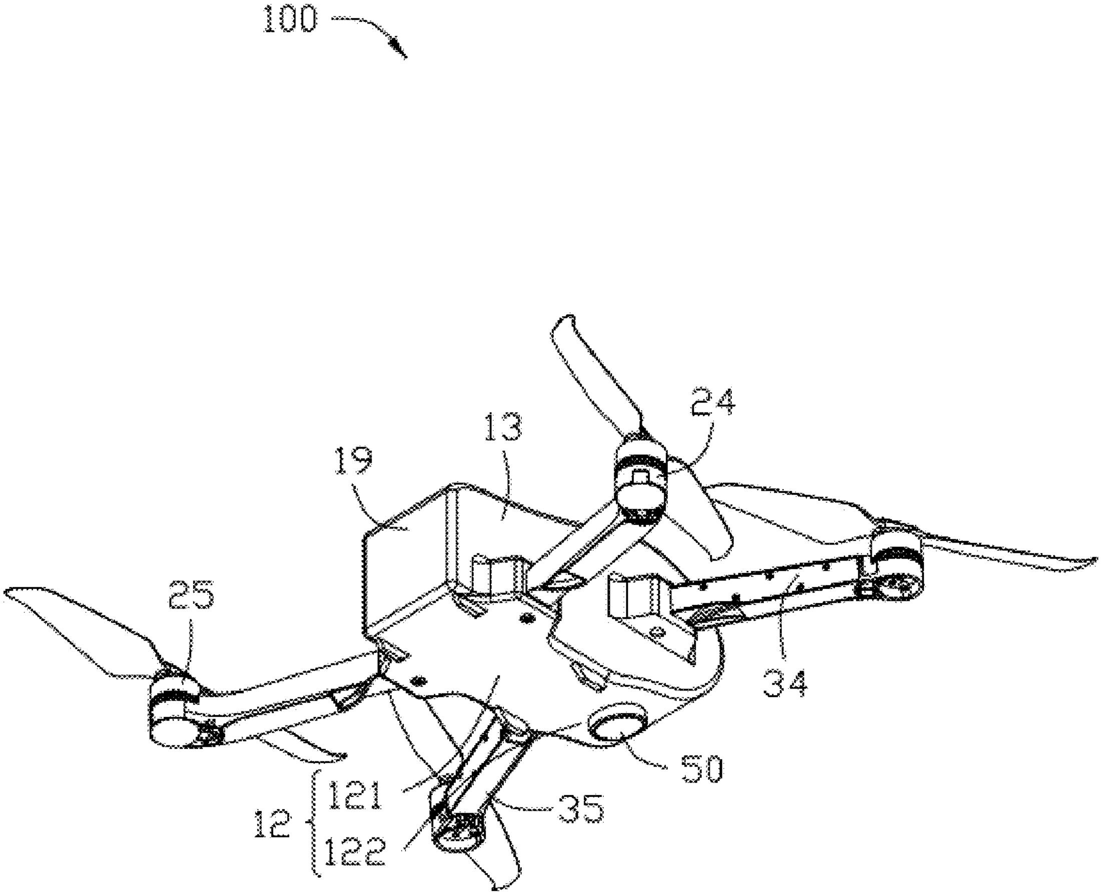
FIG. 2 is another perspective view of the panoramic UAV in FIG. 1 from a different direction, according to some implementations of the present disclosure.
Figure 5:
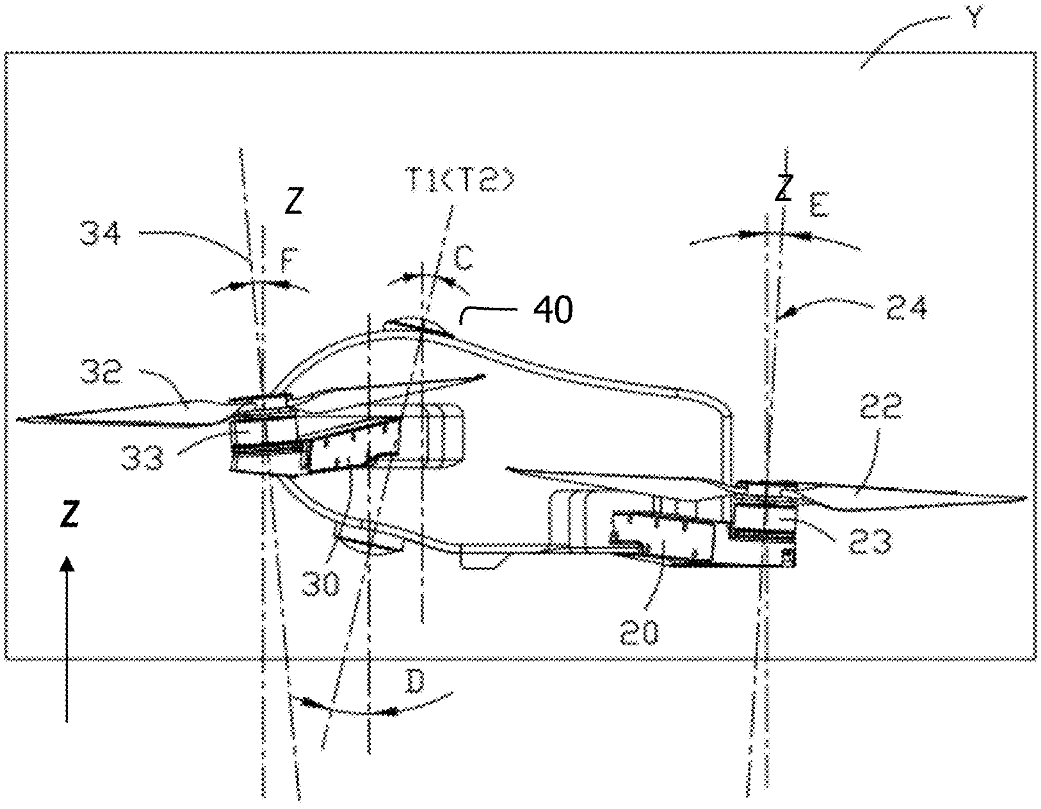
FIG. 5 is a schematic diagram of the projections of the axes of the first and second driving components on the reference plane in FIG. 3, according to some implementations of the present disclosure.

Both the rear arm 20 and the front arm 30 are located in the stitching blind area 90. The rear arm 20 can be provided on the side shell and includes a first propeller 22 and a first driving component 23 configured to drive the first propeller 22 to rotate. The front arm 30 can be provided on the side shell and include a second propeller 32 and a second driving component 33 configured to drive the second propeller 32 to rotate. As shown in FIG. 5, a plane passing through the central line of the first fisheye lens 40 and perpendicular to a horizontal plane can be defined as a reference plane Y. The projection of the axis 24 of the first driving component 23 on the reference plane Y may intersect with the projection of the axis 34 of the second driving component 33 on the reference plane Y below the bottom shell 12 and between the first driving component 23 and the second driving component 33. In some implementations, multiple rear arms 20 (e.g., two rear arms) may be provided on the body 10, and each of the rear arms 20 may include a first driving component 23 having an axis 24. Additionally, multiple front arms 30 (e.g., two front arms) may be provided on the body 10, and each of the front arms 30 may include a second driving component 33 having an axis 34. Similarly, in these implementations, the projection of at least one of the axes 24 on the reference plane Y may intersect with the projection of at least one of the axes 34 on the reference plane below the bottom shell 12 and between their respective first driving component 23 and second driving component 33. In some implementations, the first fisheye lens 40 may be located between the two front arms 30, as shown in FIG. 1. In such scenarios, the central line of the first fisheye lens 40 may be located between the two front arms 30 as well, as shown in FIGS. 1 and 5. In some implementations, the second fisheye lens 50 may be located between the two front arms 30, as shown in FIG. 2. In such scenarios, the central line of the second fisheye lens 50 may be located between the two front arms 30 as well, as shown in FIGS. 2 and 5. The central line of the first fisheye lens 40 and the central line of the second fisheye lens 50 may coincide with each other in certain implementations.

The first field of view region 60 of the first fisheye lens 40 and the second field of view region 70 of the second fisheye lens 50 of the panoramic UAV 100 may intersect, thereby enabling panoramic shooting. Additionally, both the rear arm 20 and the front arm 30 can be located in the stitching blind area 90, and the projection of the axis 24 of the first driving component 23 on the reference plane may intersect with the projection of the axis 34 of the second driving component 33 on the reference plane below the bottom shell 12 and between the first driving component 23 and the second driving component 33. This arrangement means that the axis 24 of the first driving component 23 and the axis 34 of the second driving component 33 can extend outwardly inclined toward the bottom shell 12, as shown in FIG. 5 As a result, since the first propeller 22 and the second propeller 32 are driven by the first driving component 23 and the second driving component 33, respectively, the first propeller 22 and the second propeller 32 can be arranged outwardly inclined relative to the bottom shell 12. This effectively prevents the field of view range from being obstructed by the propellers.

Figure 3:
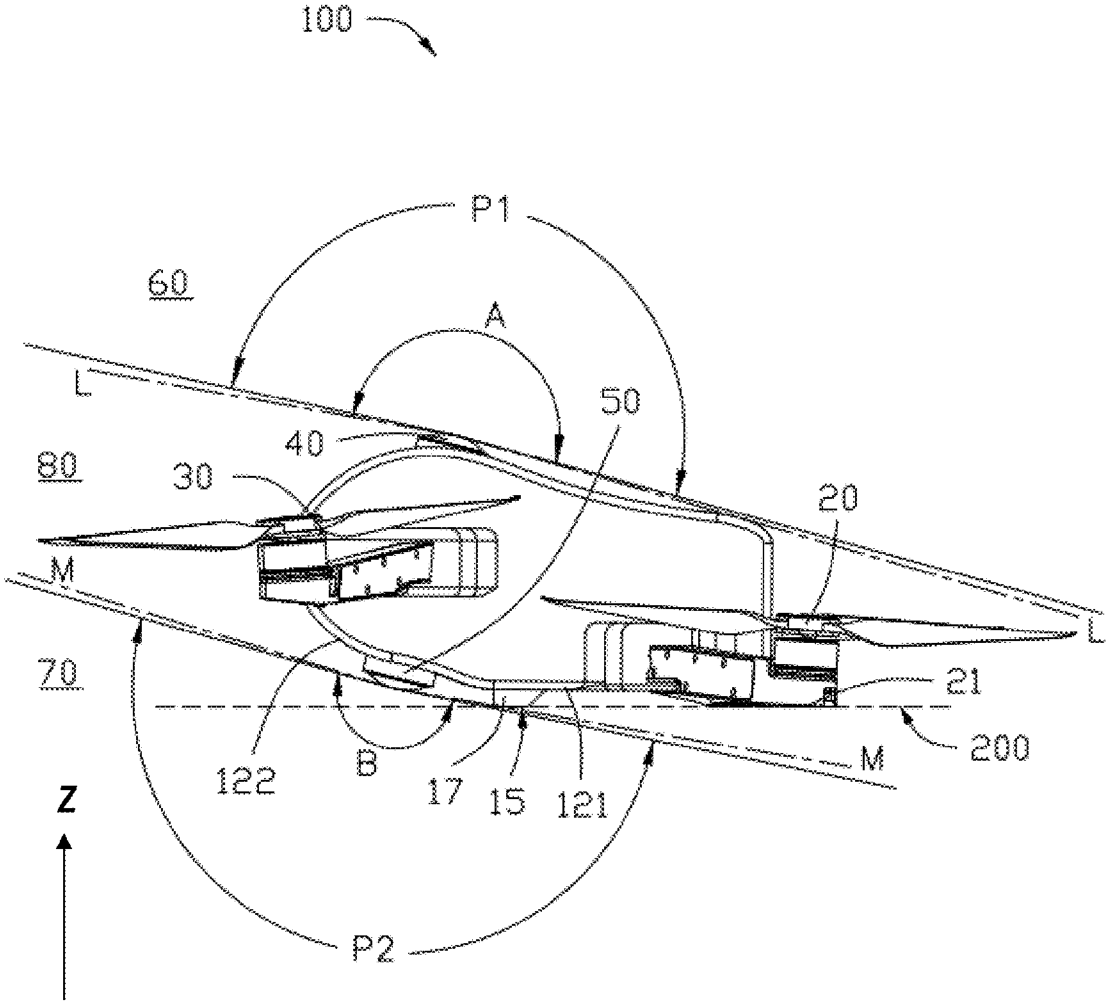
FIG. 3 is a side view of the panoramic UAV in FIG. 1, according to some implementations of the present disclosure.
Figure 6:
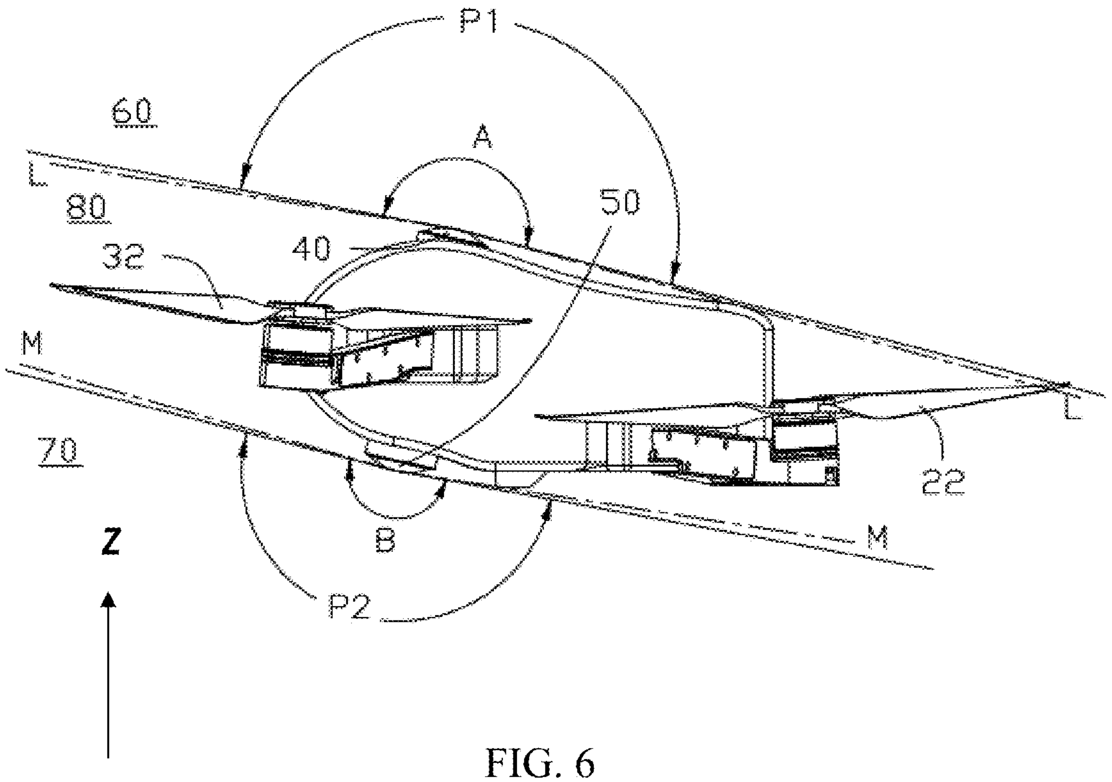
FIG. 6 is a schematic diagram of the rear arm with the first propeller inwardly inclined in FIG. 3, according to some implementations of the present disclosure.

Please refer to FIGS. 3 and 6. Taking the first propeller 22 as an example, when the first propeller 22 is outwardly inclined, compared to when the first propeller 22 is horizontally arranged or inwardly inclined, the plane in which the outwardly inclined first propeller 22 is located tends to align with the viewing angle direction of the first fisheye lens 40. This avoids the propellers obstructing the first stitching region or even the first field of view region 60, ensuring that the panoramic shooting range of the panoramic UAV 100 matches the range formed by at least the first stitching region and the second stitching region, or even the range formed by the first field of view region 60 and the second field of view region 70. In other words, the panoramic shooting range of the panoramic UAV 100 can cover the entire first stitching region and the entire second stitching region, or even the entire first field of view region 60 and the entire second field of view region 70.

For example, please refer to FIG. 6. The first fisheye lens 40 may have a first field of view angle A and a first stitching region angle P1, where the first field of view angle A may correspond to the first field of view region 60, and the first stitching region angle P1 corresponds to the first stitching region. When the first field of view angle A and the first stitching region angle P1 of the first fisheye lens 40, provided on the top shell 11, are respectively 200° and 190°, if the first propeller 22 is arranged horizontally or inwardly inclined, the orientation of the plane in which the first propeller 22 is located tends to differ from the viewing angle direction of the first fisheye lens 40. As a result, the end of the first propeller 22 farthest from the first fisheye lens 40 may extend into the first stitching region, thereby obstructing part of the first stitching region, i.e., part of the first field of view region 60. This reduces the actual field of view angle of the first fisheye lens 40 to less than the first stitching region angle P1, i.e., less than 190°. Consequently, the actual shooting range of the panoramic UAV 100 will be smaller than the range covered by the first stitching region and the second stitching region, and also smaller than the range covered by the first field of view region 60 and the second field of view region 70.

In this implementation, as shown in FIG. 3, when the first propeller 22 is outwardly inclined, the orientation of the plane in which the first propeller 22 is located tends to align with the viewing angle direction of the first fisheye lens 40, avoiding obstruction of the first stitching region by the first propeller 22. As a result, the actual field of view angle of the first fisheye lens 40 can be not less than the first stitching region angle P1, i.e., not less than 190°, and may even be the same as the first field of view angle A of the first fisheye lens 40, i.e., 200°. Thus, the actual shooting range of the panoramic UAV 100 can be not less than the range covered by the first stitching region and the second stitching region, and may even match the range covered by the first field of view region 60 and the second field of view region 70.

In some implementations, the side shell may include a first side shell 13, a second side shell 14, a first connecting shell 18, and a second connecting shell 19. The first side shell 13 and the second side shell 14 can be opposite to each other, and the first connecting shell 18 and the second connecting shell 19 may connect the two ends of the first side shell 13 and the second side shell 14. The top shell 11 can include a first top shell part 111 and a second top shell part 114 connected to the first top shell part 111. The second top shell part 114 may extend obliquely from one end of the first top shell part 111 toward the bottom shell 12. The bottom shell 12 can include a first bottom shell part 121 and a second bottom shell part 122. The second bottom shell part 122 may extend obliquely from one end of the first bottom shell part 121 toward the top shell 11.

In FIG. 3, the first field of view angle A and the first stitching region angle P1 of the first fisheye lens 40 are shown. Both the first field of view angle A and the first stitching region angle P1 of the first fisheye lens 40 can be greater than 180° (e.g., in some implementations, the second field of view angle B can be 200°, and the second stitching region angle P2 can be 190°). The range covered by the first field of view angle A can be the first field of view region 60. As shown in FIG. 3, the first field of view region 60 may include the area above lines L. Lines L may represent the two sides relative to the first fisheye lens 40 that define the boundaries of the first field of view angle A.

However, those skilled in the art should understand in conjunction with FIG. 1 that the first field of view region 60 can be essentially a partially spherical region located on the side of the mirror surface of the first fisheye lens 40 away from the bottom shell 12. The first stitching region can also be a partially spherical region located on the side of the mirror surface of the first fisheye lens 40 away from the bottom shell 12 and can be entirely within the range of the first field of view region 60.

In some examples, the first fisheye lens 40 may protrude from the first top shell part 111 of the body 10. Since the second top shell part 114 extends obliquely from one end of the first top shell part 111 toward the bottom shell 12, it prevents the top shell 11 from obstructing the first field of view region 60 of the first fisheye lens 40. Furthermore, the upper end of the central line of the first fisheye lens 40 can be inclined toward the rear arm 20, further preventing the top shell 11 from obstructing the first field of view region 60 of the first fisheye lens 40. In some implementations, the angle C formed between the central line T1 of the first fisheye lens 40 and the vertical direction (e.g., the z-direction in FIG. 5) can be less than 20°.

In some examples of the present disclosure, the vertical direction may be defined relative to the ground surface. For instance, as illustrated in FIG. 3, the vertical direction may be represented as the z-axis, which extends perpendicular to the ground plane.

FIG. 3 also shows the second field of view angle B and the second stitching region angle P2 of the second fisheye lens 50. The second field of view angle B may correspond to the second field of view region 70, and the second stitching region angle P2 may correspond to the second stitching region. Both the second field of view angle B and the second stitching region angle P2 of the second fisheye lens 50 can be greater than 180° (e.g., in this implementation, the second field of view angle B can be 200°, and the second stitching region angle P2 can be 190°). The range covered by the second field of view angle B can be the second field of view region 70, and the range covered by the second stitching region angle P2 can be the second stitching region. Similar to the first field of view region 60, the second field of view region 70 in FIG. 3 may include the area below lines M. Lines M may represent the two sides relative to the second fisheye lens 50 that define the boundaries of the second field of view angle B.

However, those skilled in the art should understand in conjunction with FIG. 1 that the second field of view region 70 can be essentially a partially spherical region located on the side of the mirror surface of the second fisheye lens 50 away from the top shell 11. The second stitching region can also be a partially spherical region located on the side of the mirror surface of the second fisheye lens 50 away from the top shell 11 and can be entirely within the range of the second field of view region 70. Since the first stitching region angle P1 and the second stitching region angle P2 are both greater than 180°, the first stitching region and the second stitching region intersect to form a stitching angle region 92. The region not covered by either the first stitching region or the second stitching region constitutes the aforementioned stitching blind area 90.

In some implementations of the present disclosure, the first field of view angle A and the first stitching region angle P1 of the first fisheye lens 40 can be the same, and the second field of view angle B and the second stitching region angle P2 of the second fisheye lens 50 can be the same. In this case, the field of view blind area 80 and the stitching blind area 90 become the same. In another implementation of the present disclosure, the first field of view angle A of the first fisheye lens 40 can be greater than the first stitching region angle P1, and the second field of view angle B of the second fisheye lens 50 can be greater than the second stitching region angle P2. In the unfolded mode, the rear arm 20 and the front arm 30 are located within the stitching blind area 90 of the first fisheye lens 40 and the second fisheye lens 50. Therefore, the panoramic image synthesized by the first fisheye lens 40 and the second fisheye lens 50 does not include other components of the panoramic UAV 100, such as the multiple arms, thereby achieving unobstructed panoramic shooting.

It should be noted that due to the severe image distortion at the field of view boundaries of fisheye lenses, removing the stitching regions at the field of view boundaries and stitching them together can result in better panoramic video effects. Additionally, the images in the stitching angle region 92 formed by the intersection of the first stitching region and the second stitching region will be removed and will not appear in the panoramic video formed after stitching.

It should be noted that in the implementations of the present disclosure, the field of view angles A and B and the stitching region angles P1 and P2 of the first fisheye lens 40 and the second fisheye lens 50 can all be the same, partially the same, or all different, and can be adjusted accordingly based on the structural configuration of the panoramic UAV 100. The present disclosure does not limit thereto.

The second fisheye lens 50 may protrude from the second bottom shell part 122. Since the second bottom shell part 122 extends obliquely from one end of the first bottom shell part 121 toward the top shell 11, it prevents the bottom shell 12 from obstructing the second field of view region 70 of the second fisheye lens 50. Furthermore, the upper end of the central line T2 of the second fisheye lens 50 can be inclined toward the rear arm 20, further preventing the bottom shell 12 from obstructing the second field of view region 70 of the second fisheye lens 50.

In some implementations, the angle D formed between the central line T2 of the second fisheye lens 50 and the vertical direction can be less than 20°. In some implementations, the central line T2 of the second fisheye lens 50 may coincide with the central line T1 of the first fisheye lens 40. This allows the second fisheye lens 50 and the first fisheye lens 40 to be almost symmetrically arranged on the body 10, thereby providing the panoramic UAV 100 with a better visual effect.

In some implementations, a supporting part 17 can be provided on the bottom shell 12 of the body 10. The surface of the supporting part 17 away from the top shell 11 can be a supporting surface 15 for contacting a landing surface 200. The second fisheye lens 50 can be entirely located between the top shell 11 and the plane where the supporting surface 15 is located. Thus, when the panoramic UAV 100 lands, the second fisheye lens 50 can be prevented from contacting the landing surface 200, thereby avoiding damage or scratches to the second fisheye lens 50 caused by the hard landing surface 200.

The rear arm 20 can be arranged close to the bottom shell 12, and the front arm 30 can be arranged in the middle portion of the side shell in the vertical direction and close to the first fisheye lens 40 in the horizontal direction. Thus, since the field of view blind area 80 between the first fisheye lens 40 and the second fisheye lens 50 becomes narrower, arranging the front arm 30 in the middle portion of the side shell in the vertical direction and close to the first fisheye lens 40 in the horizontal direction can prevent the front arm 30 from obstructing the first field of view region 60 and the second field of view region 70.

In some implementations, the rear arm 20 can include a left rear arm 251 and a right rear arm 252, which are respectively connected to the first side shell 13 and the second side shell 14. The front arm 30 can include a left front arm 351 and a right front arm 352, which are respectively connected to the first side shell 13 and the second side shell 14. The left front arm 351 and the right front arm 352 are closer to the first fisheye lens 40 in the vertical direction than the left rear arm 251 and the right rear arm 252. In some implementations, at least one of the two front arms 351 and 352 can be closer to the first fisheye lens 40 in the vertical direction than at least one of the rear arms 251 and 252. For example, the left front arm 351 is closer than the left rear arm 251; the left front arm 351 is closer than both the rear arms 251 and 252; the right front arm 352 is closer than the right rear arm 252; the right front arm 352 is closer than both the rear arms 251 and 252; both the front arms 351 and 352 are closer than the left rear arm 251; both the front arms 351 and 352 are closer than the right rear arm 252; both the front arms 351 and 352 are closer than both the rear arms 251 and 252.

The second driving component 33 of the left front arm 351 can be configured to drive the second propeller 32 to rotate, e.g., counterclockwise, and the second driving component 33 of the right front arm 352 can be configured to drive the second propeller 32 to rotate, e.g., clockwise. The first driving component 23 of the left rear arm 251 can be configured to drive the first propeller 22 to rotate, e.g., clockwise, and the first driving component 23 of the right rear arm 252 can be configured to drive the first propeller 22 to rotate, e.g., counterclockwise. The front arm 30 can be arranged near the front of the UAV, and the rear arm 20 can be arranged near the rear of the UAV. During the flight of the panoramic UAV 100, in some examples, a lift can be generated by the counterclockwise rotation of the left front second propeller 32, the clockwise rotation of the right front second propeller 32, the clockwise rotation of the left rear first propeller 22, and the counterclockwise rotation of the right rear first propeller 22, enabling the panoramic UAV 100 to take off and fly. Additionally, since the first propeller 22 and the second propeller 32 are both outwardly inclined, a component of the lift force in the anti-torque direction is obtained, thereby increasing the anti-torque force and improving the response speed during the operation of the first propeller 22 and the second propeller 32.

Figure 7:
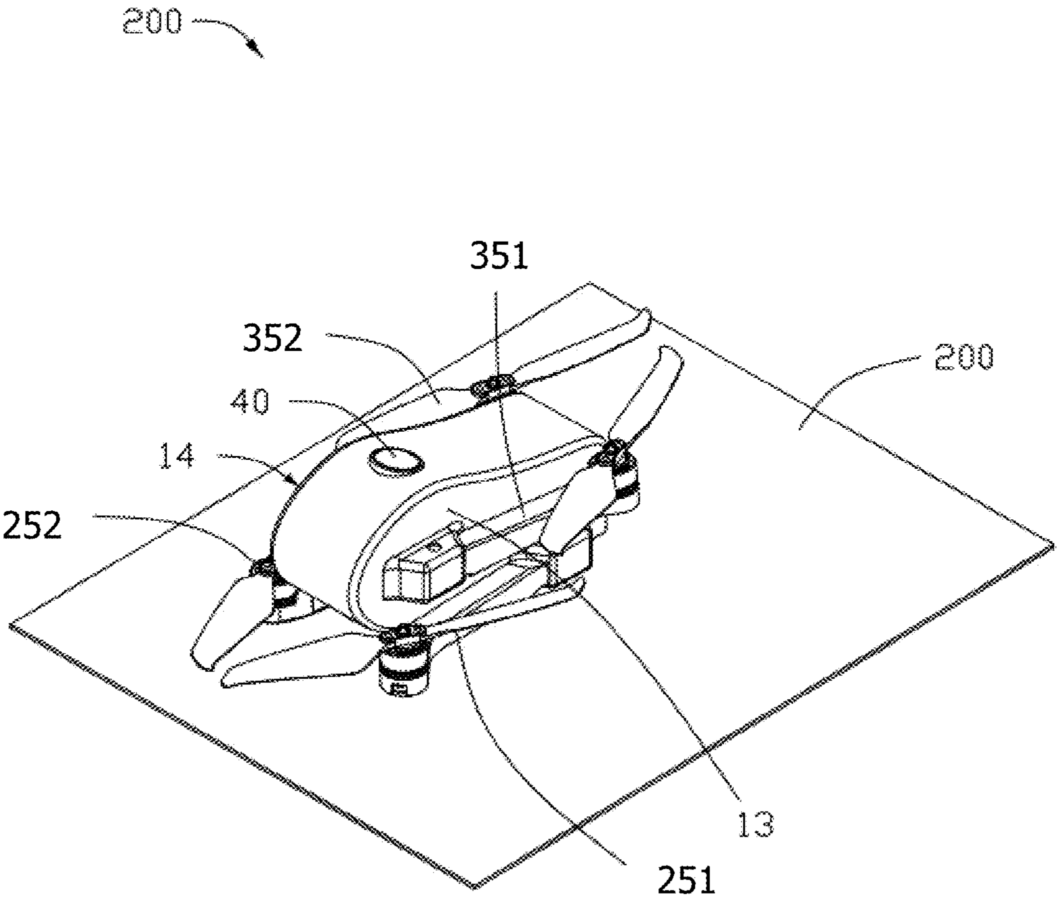
FIG. 7 is a perspective view of a panoramic UAV in a folded mode, according to some implementations of the present disclosure.

Please refer to FIGS. 1 and 7. In some implementations, neither the rear arm 20 nor the front arm 30 is foldable. In some implementations, at least one of the rear arm 20 or the front arm 30 can include an unfolded mode and a folded mode. The rear arm 20 can further include a first rotating arm 26 rotatably connected to the side shell of the body 10. The first driving component 23 can be provided at the end of the first rotating arm 26. The front arm 30 may further include a second rotating arm 36 rotatably connected to the side shell of the body 10. The second driving component 33 can be provided at the end of the second rotating arm 36. When the panoramic UAV 100 transitions from the unfolded mode to the folded mode, the first rotating arm 26 and the second rotating arm 36 can rotate toward each other and toward their respective side shells.

In some implementations, the rear arm 20 can include the aforementioned left rear arm 251 and right rear arm 252, and the front arm 30 can include the aforementioned left front arm 351 and right front arm 352. The left front arm 351 and the left rear arm 251 can rotate toward each other and toward the first side shell 13, and the right front arm 352 and the right rear arm 252 can rotate toward each other and toward the second side shell 14.

Please refer to FIG. 3. In some implementations, the end of the first rotating arm 26 away from the top shell 11 can be a grounding surface 21. In the unfolded mode, the grounding surface 21 may be coplanar with the supporting surface 15. Thus, when the panoramic UAV 100 lands, the panoramic UAV 100 can be supported by both the rear arm 20 and the supporting part 17, reducing the load on the supporting part 17 and helping to extend the lifespan of the panoramic UAV 100.

Figure 8:
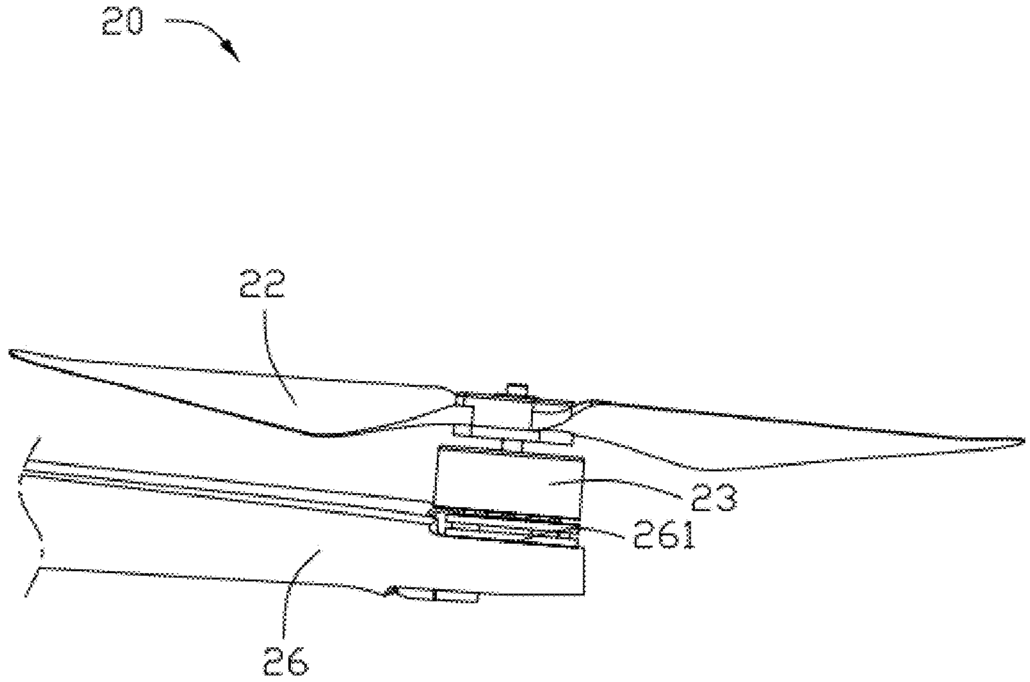
FIG. 8 is an enlarged view of the rear arm of a panoramic UAV, according to some implementations of the present disclosure.

Please refer to FIGS. 3 and 8. In some implementations, the first rotating arm 26 can include an inclined surface 261 facing the first driving component 23, as shown in FIG. 8. The first driving component 23 can be securely arranged on the inclined surface 261. The plane in which the first propeller 22 is located can be parallel to the inclined surface 261 and perpendicular to the axis 24 of the first driving component 23. The side of the first driving component 23 closer to the first fisheye lens 40 may be higher than the side of the first driving component 23 further from the first fisheye lens 40. Thus, the first propeller 22 is arranged outwardly inclined, indicating that the first propeller 22 is inclined away from the body 10 of the panoramic UAV 100. In some implementations, the first driving component 23 can be a cylindrical motor. In some examples, the structure of the front arm 30 may be the same as that of the rear arm 20 and will not be further described here.

Please also refer to FIG. 5. The angle E formed between the axis 24 of the first driving component 23 and the vertical direction can be 0° to 20°, and the angle F formed between the axis 34 of the second driving component 33 and the vertical direction can also be 0° to 20°. In accordance with some implementations of the present disclosure, the axis 24 of the first driving component 23 can intersect with the vertical direction (e.g., z-direction), as shown in FIG. 5, indicating that the axis 24 of the first driving component 23 is inclined with respect to the vertical axis. In some examples, the angle E is greater than 0° and less than 20°. In accordance with some implementations of the present disclosure, the axis 34 of the second driving component 33 can intersect with the vertical direction (e.g., z-direction), as shown in FIG. 5, indicating that the axis 34 of the second driving component 33 is inclined with respect to the vertical axis. In some examples, the angle F can be greater than 0° and less than 20°. In some implementations, multiple rear arms 20 (e.g., two rear arms) may be provided on the body 10, and each of the rear arms 20 may include a first driving component 23 having an axis 24. Additionally, multiple front arms 30 (e.g., two front arms) may be provided on the body 10, and each of the front arms 30 may include a second driving component 33 having an axis 34. Similarly, in these implementations, at least one of the axes 24 can intersect with the vertical direction (e.g., z-direction), indicating that one or more axes 24 of the rear arms 20 (e.g., left rear arm, right rear arm, both left and right rear arms, etc.) may be inclined with respect to the vertical axis. Also, at least one of the axes 34 can intersect with the vertical direction (e.g., z-direction), indicating that one or more axes 34 of the front arms 30 (e.g., left front arm, right front arm, both left and right front arms, etc.) may be inclined with respect to the vertical axis.

Although certain features and aspects of exemplary implementations have been described, those skilled in the art will recognize that many modifications are possible. For example, the methods and processes described in the present disclosure can be implemented using hardware components, software components, and/or any combination thereof. Furthermore, although various methods and processes have been described with reference to specific structural and/or functional components, the methods provided by the various implementations are not limited to any specific structural and/or functional architecture but can be implemented in any suitable hardware, firmware, and/or software configuration. Similarly, although certain functions have been attributed to certain system components, unless otherwise indicated by the context, the functions can be distributed among various other system components in several implementations.

Additionally, for convenience of description, although the methods and processes of the present disclosure have been described in a specific order, unless otherwise indicated by the context, the various processes can be reordered, added, and/or omitted according to various implementations. Moreover, the processes described for one method or process can be incorporated into other described methods or processes; however, the present disclosure is not limited to this. Likewise, the components described with respect to one system in a specific structural architecture can be organized alternatively and/or incorporated into other described systems. Therefore, although several exemplary implementations have been described above, it should be understood that the present disclosure is intended to cover all modifications and equivalents within the scope of the appended claims.

What is claimed is:

1. A panoramic unmanned aerial vehicle (UAV), comprising:

a body comprising a top shell, a bottom shell, and a side shell connected between the top shell and the bottom shell, wherein the bottom shell comprises a supporting part;

a first fisheye lens comprising a first field of view region and a first stitching region, wherein a range of the first stitching region is smaller than a range of the first field of view region;

a second fisheye lens comprising a second field of view region and a second stitching region, wherein a range of the second stitching region is smaller than a range of the second field of view region, and a region not covered by the first stitching region and not covered by the second stitching region forms a stitching blind area; and a grounding part positioned away from the bottom shell, wherein when the panoramic UAV performs panoramic shooting, the supporting part and the grounding part are located within the stitching blind area; and wherein when the panoramic UAV lands, the supporting part and the grounding part collectively support the panoramic UAV.

2. The panoramic UAV according to claim 1, further comprising:

a rear arm arranged on the body and comprising a first propeller and a first driving component configured to drive the first propeller to rotate, wherein an axis of the first driving component intersects with a vertical direction; and wherein an angle formed between the axis of the first driving component and the vertical direction is greater than 0° and less than 20°.

3. The panoramic UAV according to claim 2, wherein a side of the first driving component that is closer to the first fisheye lens is higher than another side that is further from the first fisheye lens.

4. The panoramic UAV according to claim 2, wherein:

the rear arm further comprises a first rotating arm rotatably connected with the body, and the first driving component is arranged at an end of the first rotating arm; and the first rotating arm comprises an inclined surface facing the first driving component, and the first driving component is arranged on the inclined surface, a plane in which the first propeller is located is parallel to the inclined surface and perpendicular to the axis of the first driving component.

5. The panoramic UAV according to claim 1, further comprising:

a front arm arranged on the body and comprising a second propeller and a second driving component configured to drive the second propeller to rotate, wherein an axis of the second driving component intersects a vertical direction.

6. The panoramic UAV according to claim 5, wherein an angle formed between the axis of the second driving component and the vertical direction is greater than 0° and less than 20°.

7. The panoramic UAV according to claim 5, wherein in the vertical direction, the front arm is closer to the first fisheye lens than a rear arm.

8. The panoramic UAV according to claim 5, further comprising:

a rear arm arranged on the body and comprising a first propeller and a first driving component configured to drive the first propeller to rotate, wherein:

the rear arm further comprises a first rotating arm rotatably connected with the body, and the first driving component is arranged at an end of the first rotating arm;

the front arm further comprises a second rotating arm rotatably connected with the body, and the second driving component is arranged at an end of the second rotating arm; and the first rotating arm and the second rotating arm are configured to rotate toward each other and toward the body.

9. The panoramic UAV according to claim 1, wherein:

the supporting part comprises a supporting surface at a side of the supporting part that faces away from the body, and the second fisheye lens is located above a plane where the supporting surface lies.

10. The panoramic UAV according to claim 9, wherein:

the grounding part comprises a grounding surface at a side of an end of a rear arm opposite to facing away from the top shell body comprises a ground surface; and in an unfolded mode, the ground surface is coplanar with the supporting surface of the supporting part.

11. The panoramic UAV according to claim 1, wherein at least one of an upper end of a central line of the first fisheye lens or an upper end of a center line of the second fisheye lens is inclined toward a rear arm.

12. The panoramic UAV according to claim 1, wherein a central line of the first fisheye lens and a central line of the second fisheye lens coincide to form a coincided central line.

13. The panoramic UAV according to claim 12, wherein an angle formed between the coincided central line and a vertical direction is less than 20°.

14. A panoramic UAV, comprising:

a body comprising a top shell, a bottom shell, and a side shell connected between the top shell and the bottom shell, wherein the bottom shell comprises a supporting part;

a first fisheye lens comprising a first stitching region;

a second fisheye lens comprising a second stitching region, wherein a region outside the first stitching region and outside the second stitching region forms a stitching blind area; and at least one grounding part positioned away from the bottom shell, wherein:

when the panoramic UAV performs panoramic shooting, the supporting part and the at least one grounding part are located within the stitching blind area; and when the panoramic UAV lands, the supporting part and the at least one grounding part jointly support the panoramic UAV.

15. The panoramic UAV according to claim 14, further comprising:

a front arm arranged on the body and comprising a second propeller and a second driving component configured to drive rotation of the second propeller, wherein an axis of the second driving component intersects a vertical direction; and wherein an angle formed between the axis of the second driving component and the vertical direction is greater than 0° and less than 20°.

16. The panoramic UAV according to claim 15, wherein a number of the at least one grounding part is two.

17. A panoramic UAV, comprising:

a body comprising a top shell, a bottom shell, and a side shell connected between the top shell and the bottom shell;

a first fisheye lens; and a second fisheye lens, wherein:

a central line of the first fisheye lens and a central line of the second fisheye lens coincide to form a coincided central line; and an upper end of the coincided central line is inclined toward a rear side of the body.

18. The UAV according to claim 17, wherein the first fisheye lens protrudes from a top of the body, and the second fisheye lens protrudes from a bottom of the body.

19. The panoramic UAV according to claim 17, further comprising:

a supporting part disposed at a bottom of the body; and a grounding part positioned away from the bottom shell, wherein when the panoramic UAV lands, the supporting part and the grounding part collectively support the panoramic UAV.

20. The panoramic UAV according to claim 18, further comprising:

a rear arm arranged on the body and comprising a first propeller and a first driving component configured to drive the first propeller to rotate; and a front arm arranged on the body and comprising a second propeller and a second driving component configured to drive the second propeller to rotate, wherein in a vertical direction, the front arm is closer to the first fisheye lens than the rear arm.

21. The panoramic UAV according to claim 20, wherein:

the rear arm further comprises a first rotating arm rotatably connected with the body, and the first driving component is arranged at an end of the first rotating arm;

the front arm further comprises a second rotating arm rotatably connected with the body, and the second driving component is arranged at an end of the second rotating arm; and the first rotating arm and the second rotating arm are configured to rotate toward each other and toward the body.

22. A panoramic UAV, comprising:

a body comprising a top shell, a bottom shell, and a side shell connected between the top shell and the bottom shell, wherein the bottom shell comprises a supporting part;

a first fisheye lens;

a second fisheye lens; and at least one grounding part positioned away from the bottom shell, wherein a central line of the first fisheye lens and a central line of the second fisheye lens coincide, and wherein when the panoramic UAV lands, the supporting part and the at least one grounding part jointly support the panoramic UAV, and the second fisheye lens is located above a plane where the supporting part lies.

23. The panoramic UAV according to claim 22, wherein the coincided central line of the first fisheye lens and the central line of the second fisheye lens intersect with a vertical direction.

24. The panoramic UAV according to claim 23, wherein the coincided central line is inclined toward a rear arm.

25. The panoramic UAV according to claim 22, wherein a number of the least one grounding part is two.

26. The panoramic UAV according to claim 22, further comprising:

a rear arm arranged on the body and comprising a first propeller and a first driving component configured to drive rotation of the first propeller, wherein an axis of the first driving component intersects with a vertical direction.

27. The panoramic UAV according to claim 22, wherein:

the at least one grounding part comprises a grounding surface at a side of an end of a rear arm facing away from the top shell; and in an unfolded mode, the ground surface is coplanar with a supporting surface of the supporting part.

28. The panoramic UAV according to claim 26, wherein an angle formed between the axis of the first driving component and the vertical direction is greater than 0° and less than 20°.

29. The panoramic UAV according to claim 22, further comprising:

two front arms arranged on the body, wherein:

at least one of the two front arms comprises a second propeller and a second driving component configured to drive rotation of the second propeller; and an axis of the second driving component intersects a vertical direction.

30. The panoramic UAV according to claim 29, wherein an angle formed between the axis of the second driving component and the vertical direction is greater than 0° and less than 20°.

* * * * *